(12) United States Patent
Houston

(10) Patent No.: US 6,477,312 B1
(45) Date of Patent: Nov. 5, 2002

(54) INSTANT REPLAY SYSTEM

(75) Inventor: Theodore W. Houston, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 834 days.

(21) Appl. No.: 08/761,262

(22) Filed: Dec. 6, 1996

(51) Int. Cl.[7] .............................. H04N 5/76; H04N 5/92
(52) U.S. Cl. ........................... 386/46; 360/7; 369/60.01
(58) Field of Search ................................ 386/1, 46, 68, 386/77, 81–82; 369/60.01; 360/7; 348/1, 5, 7, 10, 559, 560, 725, 571, 722, 714; H04N 5/76, 5/92, 5/14, 9/79, 5/783

(56) References Cited

U.S. PATENT DOCUMENTS

| | | | | |
|---|---|---|---|---|
| 4,962,543 A | * | 10/1990 | Kuge et al. .................... 455/89 |
| 5,241,428 A | * | 8/1993 | Goldwasser et al. ........... 360/32 |
| 5,329,320 A | * | 7/1994 | Yifrach ........................ 348/738 |
| 5,371,551 A | * | 12/1994 | Logan et al. ................ 348/714 |
| 5,517,320 A | * | 5/1996 | Schuler ........................ 386/46 |
| 5,576,950 A | * | 11/1996 | Tonomura et al. .......... 386/121 |

\* cited by examiner

*Primary Examiner*—Thai Tran
(74) *Attorney, Agent, or Firm*—Wade James Brady, III; Frederick J. Telecky, Jr.

(57) ABSTRACT

A short segment recording and replay system which includes a receiver for receiving and displaying audiovisual information and an endless memory for storage of continuous short segments of the audiovisual information concurrent with display thereof by the receiver. A controller is responsive to a predetermined condition to freeze the contents of the endless memory therein. The endless memory is preferably a addressable random access memory which can be in a plug-in module. The system includes a switching element responsive to the controller for transmitting the contents of the endless memory to the receiver for display. Special effects can be added to the audiovisual information prior to storage thereof in the endless memory or prior to transmitting the contents of the endless memory to the receiver for display.

19 Claims, 1 Drawing Sheet

INSTANT REPLAY SYSTEM

BACKGROUND OF THE INVENTION

1. Field of the Invention

This invention relates to a system for recording and reproducing short segments of a received audiovisual signal.

2. Brief Description of the Prior Art

In accordance with the prior art, television programming has been recorded using systems employing unidirectional tapes. Such systems have generally demonstrated slow start up and slow rewind capabilities. It has also been difficult to locate a particular point of interest on a recorded videotape rapidly. It is therefore apparent that there is a need for a system capable of preserving a video program for future viewing along with a capability of identifying selected segments of the video program shortly after viewing for separate storage and/or replay. In prior art video cassette recording systems, rewind has been slow and slow motion has been provided with reduced quality. Prior art special effects video systems have also been relatively expensive and of questionable reliability.

SUMMARY OF THE INVENTION

Briefly, in accordance with the present invention, there is provided a system for storing and reproducing segments of a received audiovisual signal separate from any other recording of the signal for immediate or later replay on command of the viewer. The segments are sufficiently long to store a sequence of interest, such as a key portion of a sports event, and sufficiently short to be economically feasible and convenient to use. It is anticipated that this will be shorter than a standard VCR tape. A standard audiovisual signal, which can be analog or digital, is received from a station, a recording, a computer network or other standard source at a receiver and generally simultaneously or concurrently displayed and/or recorded at a recorder. The signal is displayed at the receiver and recorded in memory at the receiver. The memory can include one or more of a short segment magnetic memory, semiconductor memory, preferably in the form of a random access memory (RAM) or a plug-in memory which can be magnetic or semiconductor. The short segment memory is an endless memory, this being provided, for example, by an endless magnetic tape, a shift register in a ring configuration or by an addressable RAM wherein the memory elements are addressed sequentially in an endless manner by continually repeating the sequence. A conversion of analog signals to digital prior to recording allows storage in conventional solid state memory and simplifies the application of special effects to the recorded signal for subsequent reproduction and display. The recorder can also have provision to store the entire signal being received in a separate storage device and also provide the short segment storage separately as discussed above.

The received signal is viewed at a display by a viewer who can control the recording/playback of information to/from the endless memory, preferably by operating a remote control transmitter. When a viewed segment is to be retained, the viewer operates the transmitter to provide a signal to a controller. The controller immediately or after some predetermined time delay freezes the then recorded information in the short segment storage. That is, recording over the recently recorded information is stopped. The transmitter can then be operated to cause replay of the information recorded in the short segment storage at the receiver or retention of this information in storage for future use. It is apparent that the recorded information can be operated upon using known techniques to provide special effects, such as single frame viewing, slow motion, zoom and the like. The special effects can also be added to the signal prior to recordation.

A standard video recorder can be used in conjunction with the present invention. An audiovisual signal can be received directly from the standard video recorder or from a receiver. A switch under control of the controller applies the received signal to one or more of a plug-in-module, a short segment recorder which can be a semiconductor memory such as a RAM, an endless video tape or other recording device and a standard video recording system such as, for example, a semiconductor storage device or a VCR tape. When a signal of appropriate type is received at the switch, indicating that a short segment is to be retained, the switch ceases to send signals to the module or short segment VCR either immediately or after a predetermined time delay and freezes the information stored in these short segment storage devices. Upon appropriate signalling from the controller, the information stored in the plug-in module and/or the short segment VCR is played back through the switch to the receiver. The information played back can be provided with special effects either before recordation thereof or during the playback. The special effects can be provided by the switch or by other standard devices.

The short segment continuous recorder can be a stand alone appliance to be used with a television set, or it can be incorporated into a television set, a video cassette recorder, video player or computer. If incorporated into a VCR, the short segment can serve the function of providing special effects, such as freeze frame or rewind/display of the previously viewed segment, optionally in slow motion or with other effects, such as zoom.

DESCRIPTION OF THE PREFERRED EMBODIMENT

Figure 1:
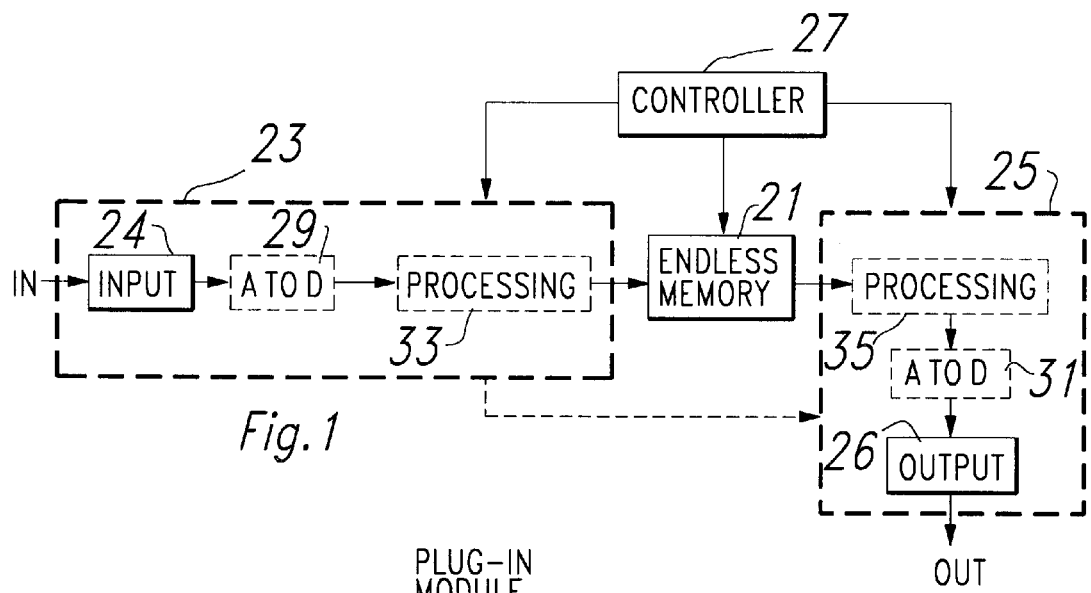
FIG. 1 is a block diagram of an instant replay system in accordance with the present invention.

Referring first to FIG. 1, there is shown a generalized block diagram of a circuit in conjunction with the present invention. The circuit includes an endless memory 21 having an input circuit 23 and an output circuit 25. The input and output circuits are controlled by a controller 27 which can, in turn, be externally controlled. By inhibiting the input circuit 23 alone, information stored in the endless memory 21 will be retained therein without being overwritten. The contents of the endless memory 21 will be sent through the output circuit 25 as long as the output circuit 25 has not been inhibited by the controller 27. In this way, a signal passing through the endless memory 21 can be delayed by the length of the endless memory (or less if the controller dictates a readout from a location in the endless memory other than the end thereof), retained in the endless memory for a period greater than the length of the endless memory by inhibiting the input circuit 23 and read out at any time by non-inhibiting of the output circuit 25. The endless memory 21 can also retain multiple segments of information provided through the input circuit 23 at different times, with the capability of reading out any particular segment under control of the controller 27.

Optionally, input information can be stored at a single specified segment of the endless memory, or it can be stored sequentially in multiple segments. Also, optionally, output information can be taken from a single segment or sequentially from multiple segments. Optionally, individual segments can be specified to retain the current contents and not be overwritten with succeeding input. Optionally, the entire endless memory or individual segments can be plug-in units.

As a further option, if the input signal from input circuit 23 is analog and it is desired to store this signal digitally, an A/D converter 29 can be included between the input circuit and the endless memory 21. Furthermore, if the signal stored in the endless memory 21 is to be digital and it is desired to provide an analog output, a D/A converter 31 can be provided between the endless memory and the output circuit 25. Other processing, such as data compression and data decompression, filtering and special effects, such as zoom and picture overlay, can optionally be included between input and endless memory and between endless memory and output.

Also, optionally, information can travel from input to output either directly or with intervening processing, such as filtering or performing special effects, while omitting retrieval from endless memory. This can be done concurrently with storage of information in endless memory.

Figure 2:
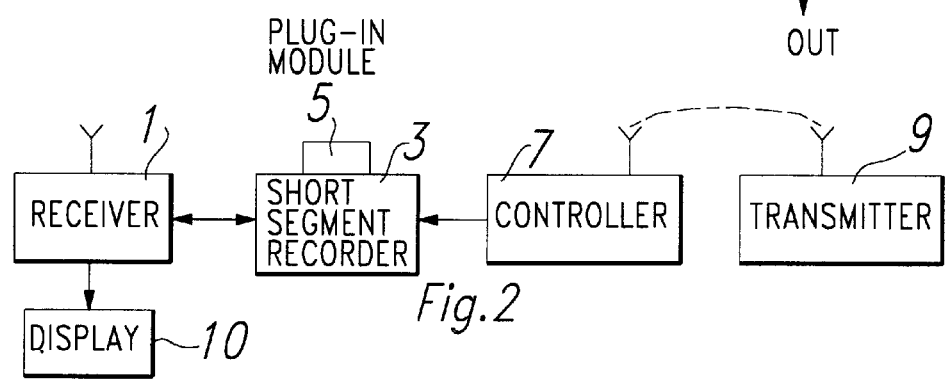
FIG. 2 is a block diagram of an instant replay system in accordance with a second embodiment of the invention.

With reference to FIG. 2, there is shown a typical receiver 1 to which are coupled a display 10 and a short segment endless memory recorder 3 having an optional plug-in module memory element 5. It should be understood that the signal to the television receiver 1 can also initially pass through the recorder 3 in standard manner or be split and pass to both the receiver 1 and the recorder 3 simultaneously. The input can be from any standard source, such as broadcast, cable or recorded media. The recorder 3 includes a memory which can be integral therewith, the plug-in module 5 or a combination of the integral memory and plug-in module for short segment recording and reproduction. When there are both the integral and plug-in module, there is optionally the mode to transfer information from the integral to the plug-in module memory. The recorder 3 can optionally operate in the record or play mode. The memory can be a magnetic recording or a solid state memory, such as, for example, a random access memory (RAM). Signals received by the receiver 1 are also received concurrently at the recorder 3 and recorded therein in the integral memory, plug-in memory or both. The memory has a finite short length whereby it is capable of storing the incoming signals for a short time period, e.g. two minutes, ten seconds, etc., before storage returns to the beginning of the memory devices with overwrite of the information previously recorded at each storage location. It follows that, in the present example, the last, for example, ten seconds of viewed information is always stored in the recorder 3.

By providing an appropriate signal to a controller 7, which can be located in the receiver 1, the recorder 3 or as a separate unit as shown, such as by an infrared signal of standard type, a viewer can operate a transmitter 9 to retain the previously viewed, for example, ten seconds of information at the recorder 3, either in the integral memory or in the plug-in module 5 or both. The plug-in module 5 can be replaced with the recorded segment being retained for future replay. In addition, the information stored in the integral memory and/or module 5 can be replayed at the receiver immediately, either in place of the received picture or as a separate picture within the picture being viewed in standard manner. This is accomplished by operating a replay signal at the transmitter 9 in standard manner. It can be seen that the instant replay system as demonstrated provides the viewer with a time window within which to determine whether to record a viewed segment without loss of the information.

The recorder 3 can have plural integral memories and/or plug-in modules 5. In this case, plural short segments can be separately recorded for replay or storage. Also, this would provide the ability to continue to record and view incoming signals to the receiver 1 with the ability to freeze portions thereof in a different memory after freezing recording of prior viewed signals in a memory.

As an alternative, the short frozen segments of information can be stored back-to-back in a separate single storage element or region, as selected by the viewer, and played back in sequence at a later time. These segments can also individually be provided with an address so that, upon playback, the viewer can address a particular segment rather than be required to play back all of the recorded information up to the sequence to be viewed.

In operation, a standard TV signal is received from a station or from a recording at the receiver 1 and substantially simultaneously or concurrently at recorder 3. The signal is converted and displayed at the receiver 1 and recorded in the memory at recorder 3 and/or the plug-in module 5. The recorded signals can be analog, originally digital or converted from analog to digital. A conversion of the signal from analog to digital prior to recording allows storage in a solid state digital memory and simplifies the application of special effects to the recorded signal for subsequent reproduction and display. Optionally, compression techniques can be applied to the information. The recorder 3 can have provision to store the entire signal being received in a first storage device and also provide the short segment storage separately as discussed above. The signal is viewed at the receiver 1 by a viewer controlling the transmitter 9. When a viewed segment is to be retained, the viewer operates the transmitter 9 to provide a signal to the controller 7. The controller immediately or after some predetermined time delay freezes the then recorded information in the short segment storage. The transmitter 9 can then be operated to replay the information recorded in the short segment storage at the receiver or retain this information in storage for future use. It is apparent that recorded information can be operated upon using known techniques to provide special effects, such as single frame viewing, slow motion, zoom and the like.

Figure 3:
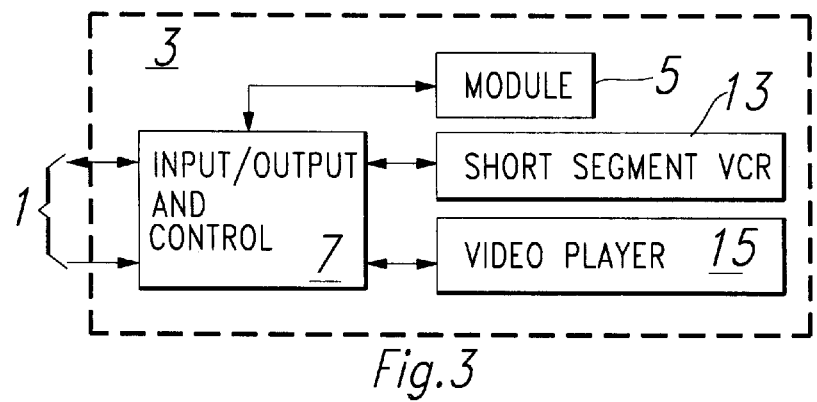
FIG. 3 is a block diagram of a recorder for use in accordance with the present invention.

Referring now to FIG. 3, there is shown a typical recorder/player 3 that can be used in accordance with the present invention. An audiovisual signal can be received directly from an external source 1 or from the video player 15. The controller 7 applies the received signal to one or more of a plug-in-module 5 and a short segment recorder 13 which can be a semiconductor memory such as a RAM or other recording device. When the received signal is from an external source, it can also be applied to the video player 15 if it is also a recorder, such as a standard VCR. When a signal of appropriate type is received at the controller indicating that a short segment is to be retained, the controller ceases to send signals to the module 5 or the short segment VCR 13 (or to a specified segment thereof) either immediately or after a predetermined time delay and freezes the information stored in these short segment storage devices. Upon appropriate signalling from the controller 7, the information stored in the plug-in module 5 or the short segment VCR 13 is played back to the output. The information played back can be optionally processed before recordation thereof and/or during the playback.

In another mode of operation of the system in FIG. 3, information is taken from the standard video player 15 for output and is substantially simultaneously recorded in the short segment VCR 13 and/or the module 5. In this mode of operation, special effects, such as single frame, slow motion or zoom can be obtained by retrieving information from the short segment VCR and/or module 5. Slow motion for an interval longer than that stored in the short segment VCR and/or module 5 can optionally be obtained by periodically retrieving sequentail segments from the standard VCR 15 and storing them in the short segment VCR and/or module 5. This is facilitated by arranging the memory of the short segment VCR and/or module 5 in multiple segments such that information can be retrieved from one segment substantially concurrently with storage of information in another segment.

In one embodiment of the system in FIG. 3, digital information is stored in the short segment VCR 13 and/or module 5 and analog information is stored in the medium for video player 15. Circuitry for conversion from analog to digital format is included for retrieval of information from the video player for storage in the short segment VCR 13 and/or module 5. Optionally, digital circuitry is included to process the digital information stored in and/or retrieved from the short segment VCR 13 and/or module 5 to provide special effects. Optionally, the input and output information at receiver 1 is formatted as digital or analog.

Optionally, the standard VCR 15 in FIG. 3 can be replaced by a video player for playing recorded audiovisual information.

Though the invention has been described with respect to specific preferred embodiments thereof, many variations and modification will immediately become apparent to those skilled in the art. For example, control input can be input by directly coupled means, such as a keyboard or control panel switches. Also, instead of using a switch to stop sending information to the endless memory, the input of the endless memory can be disabled. It is therefore the intention that the appended claims be interpreted as broadly as possible in view of the prior art to include all such variations and modifications.

What is claimed is:

1. A short segment audiovisual recording and replay system which comprises:
   (a) a receiver for receiving a continuous stream of audiovisual information;
   (b) an output for outputting said audiovisual information;
   (c) an endless memory for receiving and continually passing therethrough short segments of said continuous stream of audiovisual information received by said receiver; and
   (d) a controller responsive to a predetermined condition for freezing the contents of said endless memory then in said endless memory in said endless memory.

2. The system of claim 1 wherein said endless memory is an addressable random access memory.

3. The system of claim 1 wherein said endless memory is a plug-in module.

4. The system of claim 1 further including switching means responsive to said controller for transmitting the contents of said endless memory to said output.

5. The system of claim 1 further including means for processing said audiovisual information prior to transmitting the contents of said endless memory to said output.

6. The system of claim 1 further including means for processing said audiovisual information prior to storing said audiovisual information in said endless memory.

7. The system of claim 5 wherein said processing of said audiovisual information comprises means for decompression of said audiovisual information.

8. The system of claim 6 wherein said processing of said audiovisual information comprises means for compression of said audiovisual information.

9. The system of claim 5 wherein said processing of said audiovisual information includes addition of special effects.

10. The system of claim 1 wherein said audiovisual information received is analog, further comprising an A/D converter for conversion of analog input signals to digital signals for storage in said endless memory.

11. The system of claim 1 wherein said endless memory includes multiple segments, said controller including means to freeze the contents of each of said multiple segments in said endless memory individually and reading out each of said multiple segments individually.

12. The system of claim 6 wherein said processing of said audiovisual information includes addition of special effects.

13. The system of claim 1 further comprising a video display system for displaying at least one of said received audiovisual information and said audiovisual information stored in said endless memory.

14. A video player system comprising:
   (a) a standard video player for outputting s continuous stream of audiovisual information stored therein;
   (b) an endless memory for receiving and continually recording segments of said continuous stream of audiovisual information from said video player;
   (c) control means for freezing the contents of said endless memory then in said endless memory in said endless memory; and
   (d) control means for outputting the contents of said endless memory frozen in said endless memory.

15. The system of claim 14 wherein said endless memory is an addressable random access memory.

16. The system of claim 14 wherein said endless memory is a plug-in module.

17. An audiovisual receiver system comprising:
   (a) an input circuit;
   (b) an output circuit;
   (c) an endless memory for receiving and continually passing therethrough audiovisual information while retaining short segments of said audiovisual information therein; and
   (d) a control system for selectively and substantially simultaneously causing one of output of information from said input circuit to said endless memory and freezing said information in said endless memory or output of information from said endless memory to said output circuit.

18. The system of claim 17 wherein said endless memory is an addressable random access memory.

19. The system of claim 18 wherein said endless memory is a plug-in module.

* * * * *

UNITED STATES PATENT AND TRADEMARK OFFICE
CERTIFICATE OF CORRECTION

PATENT NO.    : 6,477,312 B1
DATED         : November 5, 2002
INVENTOR(S)   : Theodore W. Houston It is certified that error appears in the above-identified patent and that said Letters Patent is hereby corrected as shown below:

Title page,
Under Item [22], Filed: Dec. 6, 1996, insert:

-- Related U.S. Application Data
[60] Provisional application No. 60/008,310, Dec. 7, 1995 --.

Column 1,
After line 3, insert -- This application claims priority under 35 USC 119(e)(1) of provisional application number 60/008,310, filed 12/07/1995. --.

Signed and Sealed this

First Day of July, 2003

JAMES E. ROGAN
*Director of the United States Patent and Trademark Office*